United States Patent
Kim et al.

(10) Patent No.: US 7,539,416 B2
(45) Date of Patent: May 26, 2009

(54) OPTICAL NETWORK TERMINAL AND WAVELENGTH DIVISION MULTIPLEXING BASED OPTICAL NETWORK HAVING THE SAME

(75) Inventors: Byoung Whi Kim, Daejeon (KR); Jae Woo Yang, Daejeon (KR); Hyeong Ho Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 490 days.

(21) Appl. No.: 11/005,758

(22) Filed: Dec. 6, 2004

(65) Prior Publication Data
US 2005/0123298 A1 Jun. 9, 2005

(30) Foreign Application Priority Data
Dec. 9, 2003 (KR) ............ 10-2003-0089070
Sep. 1, 2004 (KR) ............ 10-2004-0069556

(51) Int. Cl.
*H04J 14/00* (2006.01)
(52) U.S. Cl. ............................................ 398/70
(58) Field of Classification Search .......... 398/167, 398/168, 70, 58, 182, 41, 66–69, 71–72, 398/79, 95, 100
See application file for complete search history.

(56) References Cited

U.S. PATENT DOCUMENTS

| | | | |
|---|---|---|---|
| 5,886,803 A * | 3/1999 | Yamamoto et al. | 398/41 |
| 6,212,210 B1 * | 4/2001 | Serizawa | 372/32 |
| 7,177,330 B2 * | 2/2007 | Wai et al. | 372/27 |
| 2001/0004290 A1 * | 6/2001 | Lee et al. | 359/124 |
| 2003/0039277 A1 * | 2/2003 | Nasu et al. | 372/34 |
| 2004/0033076 A1 * | 2/2004 | Song et al. | 398/70 |

FOREIGN PATENT DOCUMENTS

KR 1020030063085 7/2003

* cited by examiner

*Primary Examiner*—Quan-Zhen Wang
(74) *Attorney, Agent, or Firm*—Blakely, Sokoloff, Taylor & Zafman LLP

(57) ABSTRACT

Disclosed is a loop-back optical network terminal using a Febry-Perot laser diode as an active type optical modulator in a wavelength division multiplexing based optical network. In addition, a wavelength division multiplexing based optical network having the same is disclosed. The optical network terminal comprises a modulation timing control signal generator receiving a downstream optical signal transmitted from a central office and generating a timing control signal designating a start timing and an end timing for modulating an upstream optical signal to be transmitted from a user to the central office; an upstream data control circuit generating upstream data according to the timing control signal and controlling modulation of the upstream optical signal according to the timing control signal in response to generation of the upstream data; and a modulator receiving the upstream data and directly modulating the upstream data with loop-backing the downstream optical signal to produce the upstream optical signal and then output it to the central office.

9 Claims, 11 Drawing Sheets

--PRIOR ART--

US 7,539,416 B2

OPTICAL NETWORK TERMINAL AND WAVELENGTH DIVISION MULTIPLEXING BASED OPTICAL NETWORK HAVING THE SAME

BACKGROUND OF THE INVENTION

This application claims the priority of Korean Patent Application Nos. 2003-89070, filed on Dec. 9, 2003 and 2004-69556 filed on Sep. 1, 2004 in the Korean Intellectual Property Office, the disclosures of which are incorporated herein in their entirety by reference.

1. Field of the Invention

The present invention relates to an optical network terminal (ONT) and a wavelength division multiplexing (WDM) based optical network having the same, and more particularly, to a loop-back ONT using a Febry Perot laser diode (FP-LD) as an active optical modulator, not as an optical source, in a WDM based optical network and a WDM based optical network having the same.

2. Description of the Related Art

It is expected that the integrated triple play service of voice, data, and digital broadcasting service will be a major stream in communication services within several years. However, current digital subscriber line (DSL) technologies using a unshielded twisted pair (UTP) or cable modem termination system (CMTS) technologies using a hybrid fiber coaxial (HFC) cable would not guarantee sufficient bandwidths and transmission quality required to provide subscribers with such a high quality service. To solve this problem, a fiber to the home (FTTH) technology connecting optical fibers up to user's premises is being widely investigated and developed.

The most important point in developing the FTTH technology is how to obtain an optical signal transmission method which satisfies cost effectiveness and mass-productability.

On the other hand, an optical subscriber network can be classified into a passive optical network (PON) type and an active optical network (AON) type. The PON type is being developed in a variety of forms, such as ATM-PON, B-PON, G-PON, and E-PON, while the AON type is being developed in such a form that local networks composed on Ethernet switches are interconnected via optical fibers.

According to the above conventional technologies, a single wavelength is used to transmit data in each transmission direction via an optical transmission line. Therefore, such a transmission method has limitation in providing a broad bandwidth over 100 Mbps required to guarantee transmission quality for future user's needs. To overcome such a shortcoming, there have recently been efforts to introduce a wavelength division multiplexing (WDM) technology to the FTTH subscriber network in a variety of methods.

Until now, various optical transmission types have been proposed to implement such a WDM based FTTH network. Roughly, they can be classified into two types: a first type that a light source of a predetermined wavelength is installed in the ONT for upstream transmission; and a second type that the ONT has a modulator instead of the light source to modulate the light beam from the central office and then send it back to the central office. The second type is often called a loop-back type.

In the first type, typically, different wavelengths are allocated to different users connected to a particular optical line terminal (OLT). Therefore, N optical network terminals (ONTs) for outputting different wavelengths (e.g., $\lambda_1 \sim \lambda_N$) of optical signals must be provided for N users. This causes additional workloads for producing, installing, and managing the N different ONTs, which will be a more serious problem when more and more ONTs are installed.

To solve such a wavelength allocation problem, another transmission type has been proposed. In this type, a light source having no predetermined wavelength is provided to each user, and an upstream wavelength is determined based on the light beam from the central office to ONT. For this purpose, various implementation methods have been proposed.

In an implementation method, the central office transmits an incoherent wideband light beam to the ONT having super luminescence light emission diode (SLED) or erbium doped fiber amplifier (EDFA), and the transmitted wavelength is divided by the WDM de-multiplexer near the ONT and then injected into a modulator (e.g., a Febry-Perot laser diode) of the ONT to lock a wavelength of the operation modes of the FP-LD with the wavelength of the injected light. Then, the FP-LD is modulated with the upstream data under the locking state.

According to this method, the EDFA is a most effective wideband light source considering optical power of a master light beam at OLT for an injection locking of the ONT, which will be described below. However, the EDFA is still very expensive so that it does not satisfy the cost-effectiveness as required for the subscriber access network. Furthermore, this method has a limitation in a data modulation speed due to its innate optical characteristics, so that a high-speed modulation over 1 Gbps would be difficult to implement.

Another implementation method to get around the wavelength predetermination problem is to eliminate light source in the ONT. This loop-back ONT is preferable from the viewpoint of cost-effectiveness because a light source with a predefined wavelength is not required so that mass-production can be easily achieved, and the resulting ONT can be conveniently installed in the user's premises.

Typically, a conventional loop-back ONT uses a Mach-Zehnder interferometer type modulator to modulate the light beam from the CO (i.e., downstream optical signals) with data to be transmitted from a user in an entire or partial time interval to produce upstream optical signals and then transmit them to the CO.

However, a conventional loop-back ONT has shortcomings that the Mach-Zehnder interferometer is expensive and has a large optical power losses (e.g., about 7~10 dB, typically), and furthermore the downstream optical signal, which has experienced a lot of losses on the downstream path from the CO to the user, could not be reused to produce the upstream optical signal without amplification and then retransmit it to the CO. In addition, it would be also expensive to employing a conventional loop-back ONT because an optical amplification still requires considerable expense.

SUMMARY OF THE INVENTION

Accordingly, the present invention provides an optical network terminal, capable of solving the above problems such as high cost and large optical power loss in a conventional loop-back ONT.

The present invention further provides a wavelength division multiplexing based optical network having the same.

According to an aspect of the present invention, there is provided an ONT in a wavelength division multiplexing based optical network comprising: a modulation timing control signal generator receiving a downstream optical signal sent from a central office and generating a timing control signal designating a start timing and an end timing for modulating an upstream optical signal to be transmitted from a user to the central office; an upstream data control circuit generating upstream data according to the timing control signal and controlling modulation of the upstream optical signal according to the timing control signal in response to generation of the upstream data; and a modulator receiving the upstream data and directly modulating the upstream data using the downstream optical signal to produce the upstream optical signal and then output it to the central office.

According to another aspect of the present invention, there is provided a wavelength division multiplexing based optical network having the above optical network terminal.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
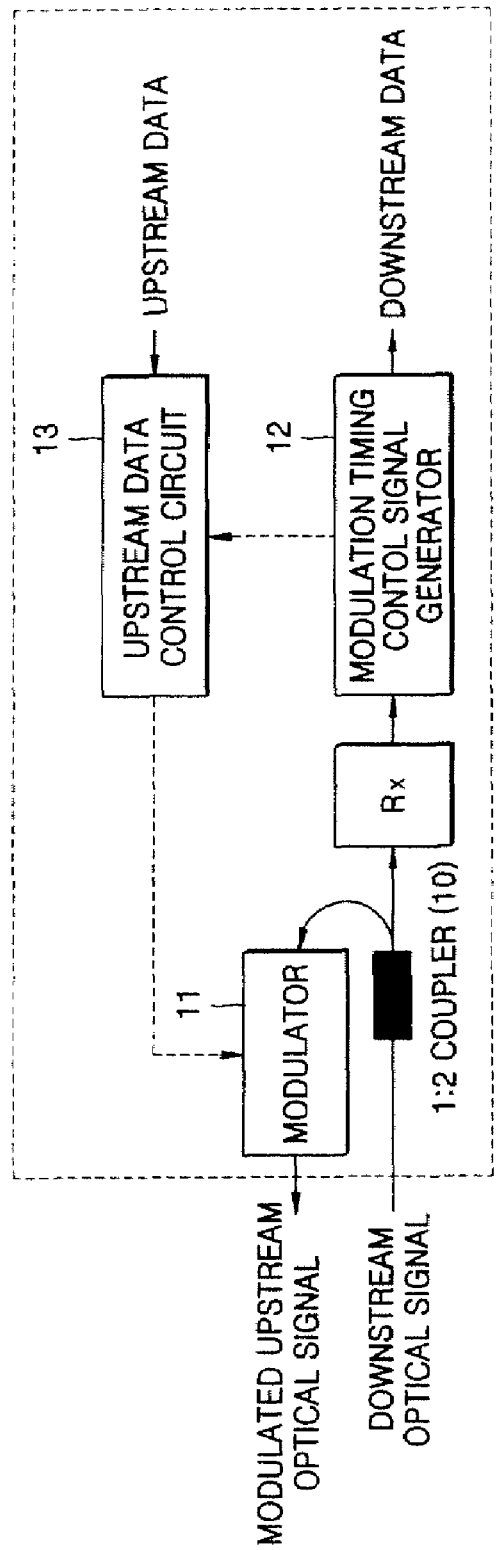
FIG. 1 is a block diagram illustrating a conventional loop-back type optical network terminal.

For a convenient understanding of the present invention, first, we will discuss some operating conditions thereof in brief.

To achieve the above objects and solve the technical problems, the present invention proposes to use a Febry Perot laser diode (FP-LD) instead of a Mach-Zehnder modulator as an active modulator. Herein, the proposed modulator is referred to as "an active modulator" because input downstream optical signals are amplified and used for sending upstream data.

According to the present invention, a single mode light beam from a central office (i.e., a master light beam) is injected into the FP-LD, and among a plurality of wavelengths of the operation modes of the FP-LD, the closest mode to the wavelength of the injected master light beam becomes dominant over others. It is needed a procedure called "a wavelength tracking," which uses a fact that the monitor photo diode (mPD) used to monitor the operating condition of the FP-LD produces a maximum output in the state of the injection locking.

For the wavelength tracking, a thermoelectric controller (TEC) and a wavelength control circuit (WCC) for receiving output signals from the mPD and determining the injection locking state are provided in the external of the FP-LD. Then, the WCC drives the TEC to change operating temperature of the FP-LD so that the operating wavelengths of the FP-LD become shifted.

In other words, to generate the injection locking state, the operating temperature of the FP-LD is automatically adjusted within a range corresponding to the operation mode interval of the FP-LD to match one of the wavelengths of the operation modes of the FP-LD with the wavelength of the master light beam. Subsequently, the FP-LD directly modulates the upstream data in the state of the injection locking, and then transmits the output light beam to the CO.

The present invention will now be described more fully with reference to the accompanying drawings, in which exemplary embodiments of the invention are shown. Like reference numerals in the drawings denote like elements although they are included in different drawings, and thus their description will not be repeated. Accordingly, descriptions of a particular drawing may contain elements shown in other drawings if necessary.

FIG. 1 illustrates a conventional loop-back (LB) type optical network terminal.

An optical signal from the CO (i.e., downstream optical signal) is input to an 1:2 coupler 10, by which a part of the optical power is input to a photo diode (PD) and the remaining optical power is input to a modulator 11.

The optical signal input to the PD is converted into an electrical signal, and then input to a modulation timing control signal generator 12 for the upstream optical signal. The modulation timing control signal generator 12 determines a start timing and an end timing for modulating the upstream data with the downstream optical signal received from the CO to produce the upstream optical signal. The resulting timing control signal is sent to an upstream data controller 13.

The upstream data control circuit 13 controls an input operation of the upstream data to the modulator 11 according to the timing control signal input from the modulation timing control signal generator 12. The modulator 11 modulates the upstream data input from the upstream data controller 13 with the light beam supplied from the CO to produce an upstream optical signal and then transmits it to the CO.

Figure 2:
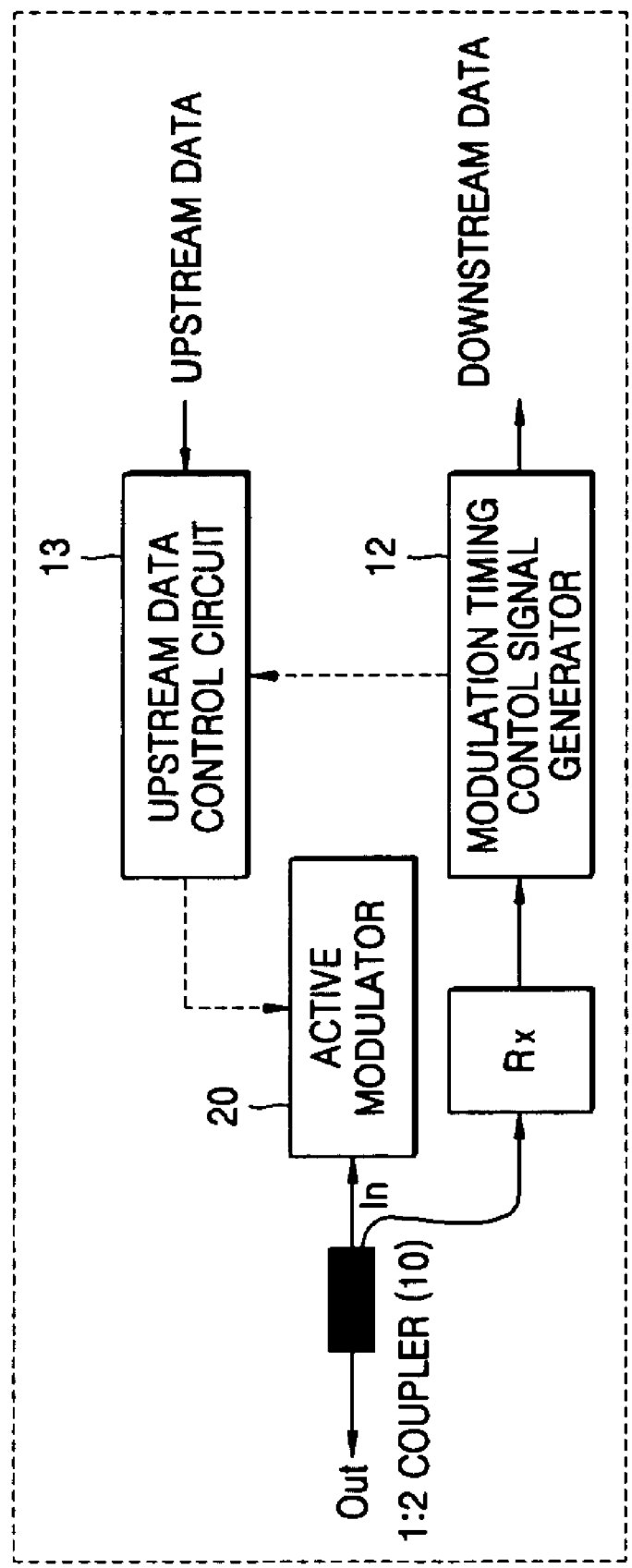
FIG. 2 is a block diagram illustrating an optical network terminal according to the present invention.

FIG. 2 illustrates an optical network terminal according to the present invention.

The modulator 11 used in the conventional optical network terminal illustrated in FIG. 1 is expensive and causes large optical power losses. To overcome such a shortcoming, the present invention proposes that the light beam from the CO be locked on one of the operation modes of the FP-LD and the locked operation mode be directly modulated with the upstream data and be transmitted to the CO.

The light beam from the CO is modulated with the upstream data, in a state that its optical power is relatively increased, due to the optical gain through the FP-LD, rather than decreased as in the conventional case, and then retransmitted to the CO. Therefore, the modulator according to the present invention will be called herein an active modulator 20. The ONT according to the present invention is similar to a typical modulator shown in FIG. 1, beside the optical output power oh the modulator is increased rather than decreased. Therefore, functions of the modulation timing control signal generator 12 and the upstream data controller 13 is similar to that shown in FIG. 1 as described above.

The ONT according to the present invention is constituted so that the optical signal input to the PD of the ONT is set to a minimum of optical power within an allowable receive sensitivity, and the remaining optical power is input to the active modulator (AM). In order to separate the upstream optical signal from the downstream optical signal and then transmit it, a circulator is provided in a front side of the WDM multiplexer (or a rear side of the WDM de-multiplexer) near user's premises. Since the circulator is shared by a plurality of multiplexed optical wavelengths, it is possible to reduce cost per a channel.

Figure 3:
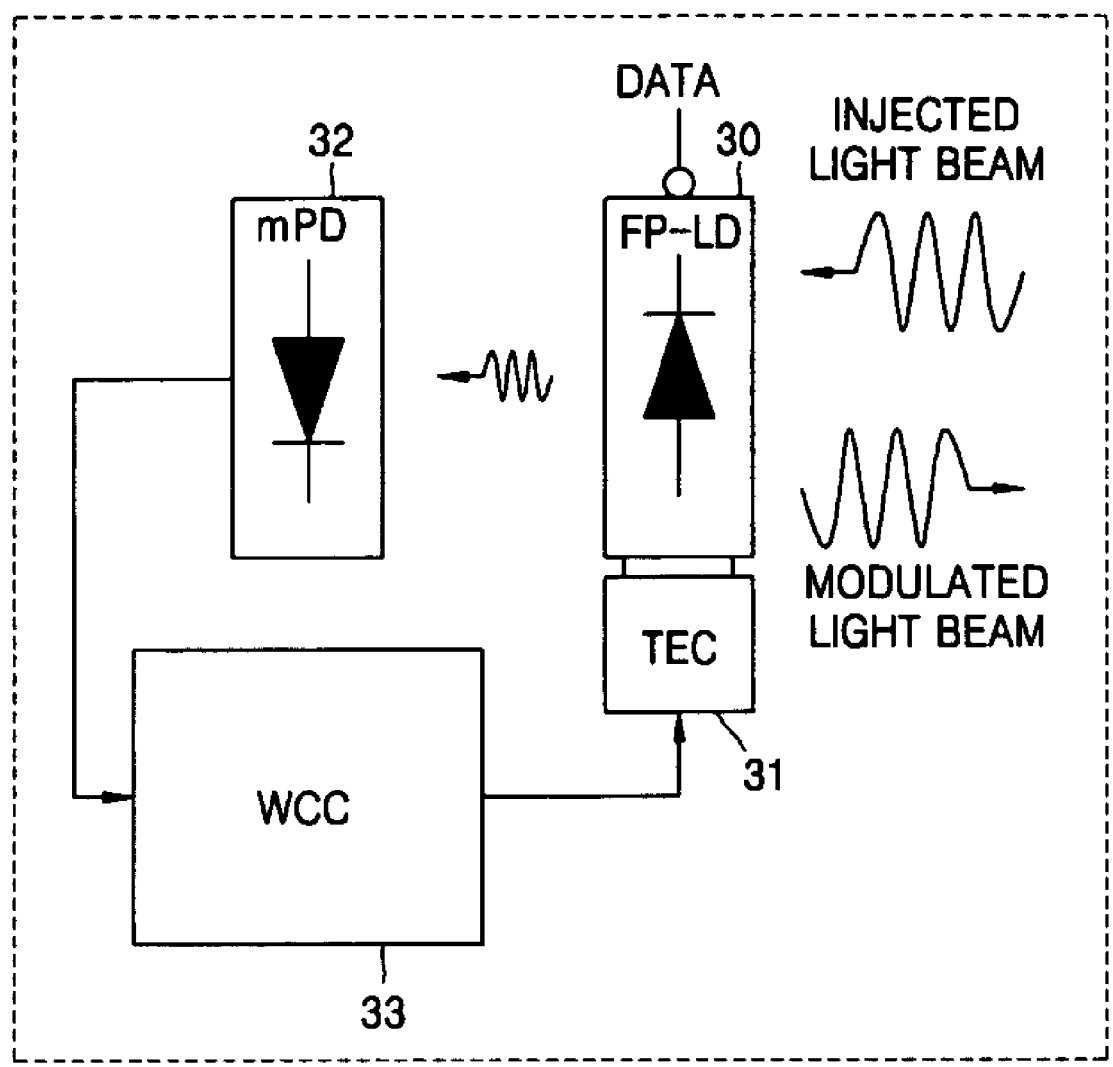
FIG. 3 is a block diagram illustrating a modulator according to an embodiment of the present invention.

FIG. 3 illustrates detailed implementation of a modulator according to an exemplary embodiment.

According to the present invention, a thermo electric controller (TEC) 31 is externally installed on the FP-LD which performs the modulation. A monitor PD (mPD) 32 for monitoring an operating state of the FP-LD receives a part of the optical power output from the FP-LD 30, and then converts it into an electrical signal having amplitude corresponding to the input optical power.

The electrical signal output from the mPD 32 is input to a wavelength control circuit (WCC) 33. The WCC 33 adjusts a voltage (or a current) applied to the TEC 31 to alter operating temperature of the FP-LD 30. As the operating temperature of the FP-LD 30 changes, center wavelengths of the operation modes of the FP-LD 30 are shifted together. In other words, higher temperature generates shifts into longer wavelengths of the modes.

Figure 4A:
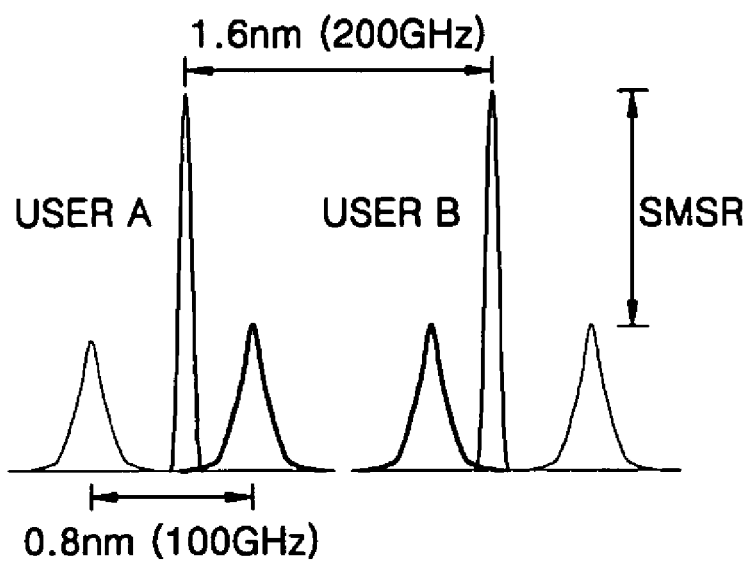
FIGS. 4A and 4B are graphs for describing an injection locking.
Figure 4B:
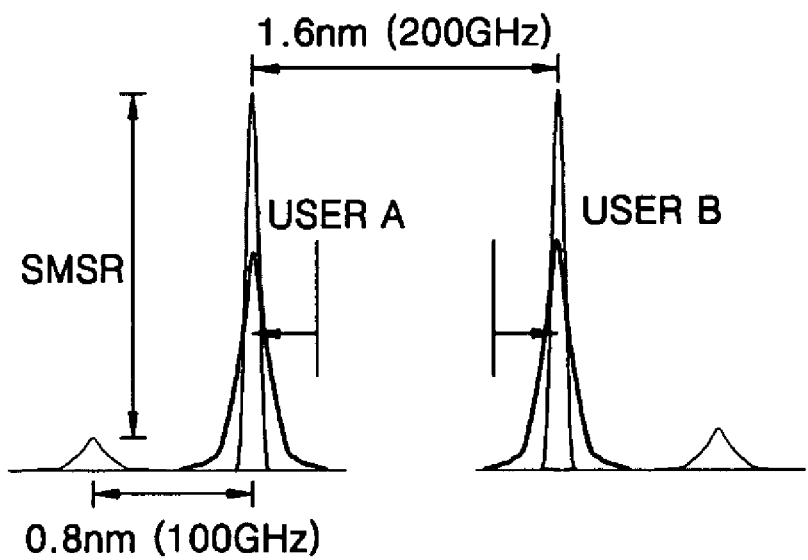

FIGS. 4A and 4B are diagrams for explaining an injection locking.

Typically, the FP-LD installed in the user's ONT emits a plurality of wavelengths of operation modes (e.g., FIG. 4A shows two operation modes). An interval between the modes depends on the cavity length of the FP-LD, and a representative 3 dB spectral width can reach 50 nm, depending on manufacturers.

FIG. 4A also shows an example of wavelength positions of two (master) light beams received at the FP-LD of two users A and B from the CO with an interval of 200 GHz. The WCC controls the TEC to shift the wavelength of the operation mode of the FP-LD over ± a half mode interval until a maximum point of the mPD output is searched, in which case the received wavelength from the OLT is matched with one of the FP-LD modes. This procedure is called a wavelength tracking.

When the output of the electrical signal of the mPD reaches its maximum, as shown in FIG. 4B, the wavelength of the master light beam is matched with one of the wavelengths of operation modes of the FP-LD on a wavelength axis, so that the injection locking (IL) is achieved. In a state of the IL, the locked mode has significantly increased power, but other modes have significantly reduced power, so that a high side mode suppression ration (SMSR) is achieved.

Generally, although the operating condition of the FP-LD having a maximum IL depends on the power amplitude of the master light beam and the characteristics of FP-LDs, it is possible to achieve the highest efficiency when the FP-LD is controlled to operate near the threshold current when the active modulator 20 is employed for the purpose of the present invention. The wavelength tracking is automatically performed with input of the master light beam, so that the center wavelength of the master light beam is matched with one of the wavelengths of the FP-LD modes regardless of variations in the center wavelength of the master light beam from the CO as well as variations in the center wavelengths of the FP-LD modes, caused by the variations in surrounding temperature and input currents.

Figure 5A:
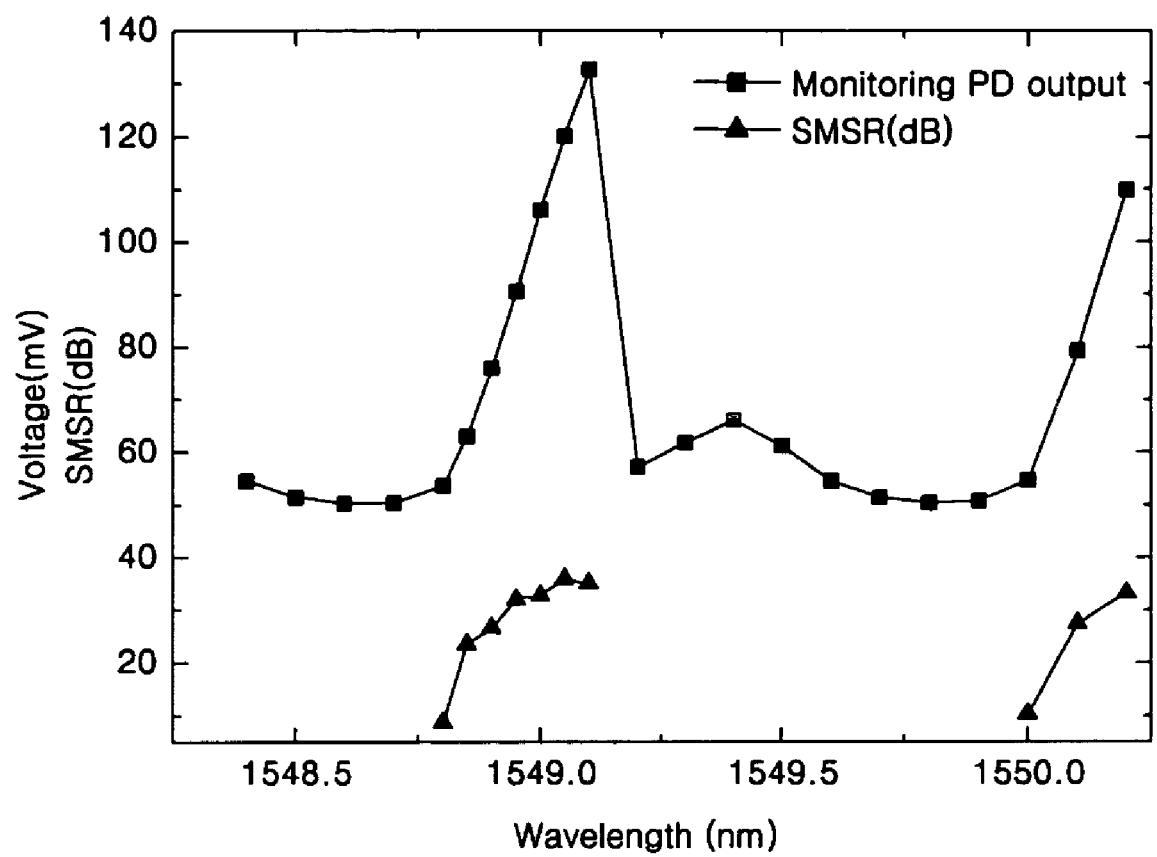
FIG. 5A is a graph showing an output electrical signal of an mPD, a voltage of an output light of an FP-LD, and a side mode suppression ratio thereof when a master light beam from OLT is injected into an FP-LD.

FIG. 5A is a graph illustrating an output electrical signal from an mPD, a voltage of an output light beam of the FP-LD, and an SMSR thereof. For this graph, the FP-LD is operated near its threshold current.

In FIG. 5A, it is possible to see that, as the center wavelength of the FP-LD mode is shifted by altering the temperature, a distance between the center wavelength of the mode of the FP-LD and the center wavelength of the master light beam varies, and thereby the IL effect also varies. In addition, it is recognized that the IL effect starts to generate when the center wavelength of a mode of the FP-LD is 1548.8 nm, and the electrical outputs of the mPD and the SMSR reach their maximum point when the center wavelength is 1549.1 nm. This maximum point is a point at which one of the wavelengths of the operation modes of the FP-LD is matched with the wavelength of the master light beam, thereby producing a maximum IL.

A considerable IL is achieved over the wavelength range of about 0.2 nm. Since the center wavelengths of the FP-LD modes are generally shifted at a rate of 0.1 nm/° C. on operating temperate variations in the operating temperate, this wavelength range corresponds to a temperature variation of about 2° C. Therefore, if a temperature adjustment interval of the TEC is set to 0.1° C., twenty or more temperature adjustment points can be provided. Therefore, there is no problem in the temperature control.

Figure 5B:
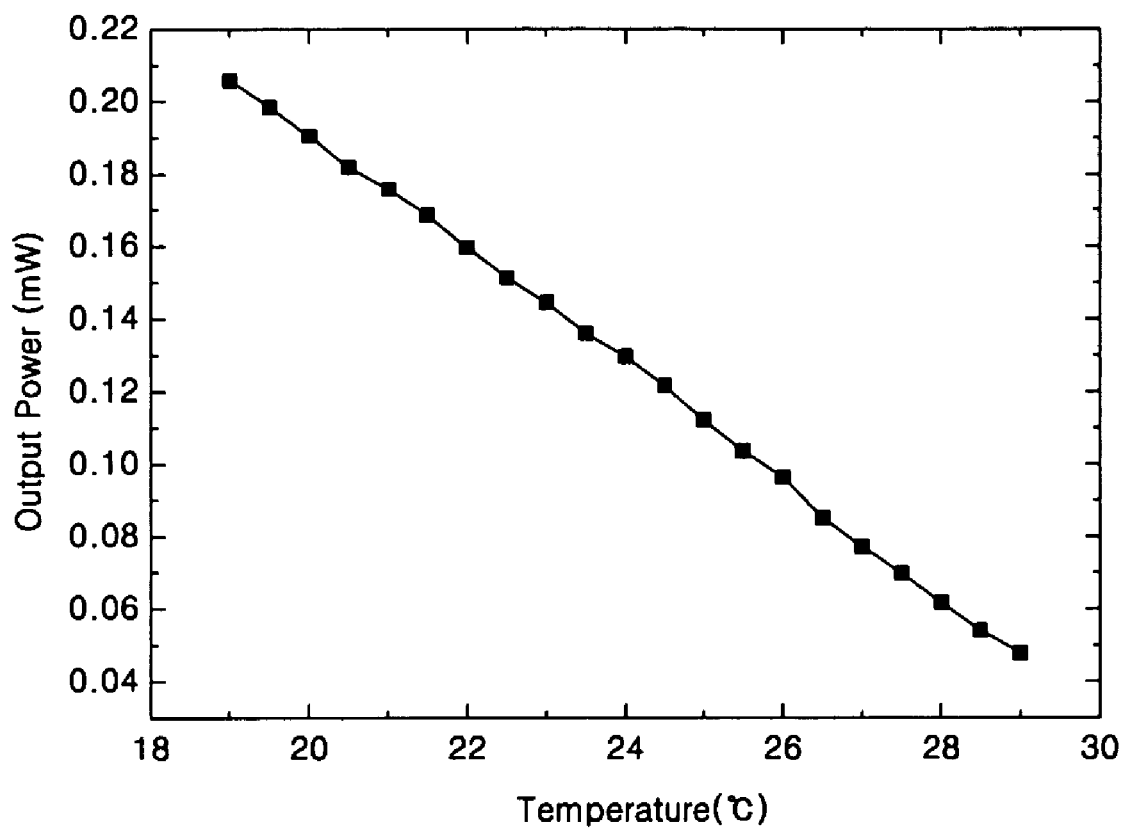
FIG. 5B is a graph showing variations in optical output power of an mPD depending on ambient temperature of an FP-LD.

FIG. 5B is a graph illustrating variations in optical output power of an mPD according to the surrounding temperature of an FP-LD. It is recognized that the optical output power is linearly changed from 0.2 mW to 0.04 mW (i.e., 13 dB) over the temperature increase of 10° C. (i.e., from 19° C. to 29° C.).

Figure 5C:
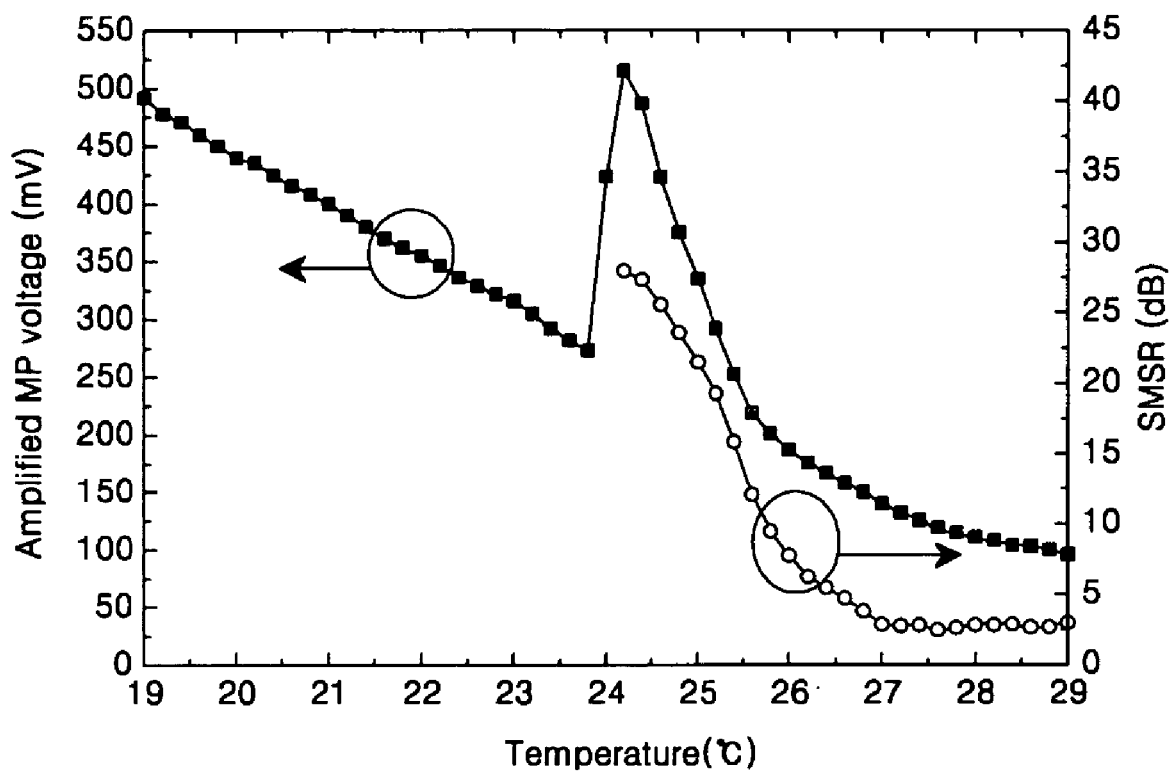
FIG. 5C is a graph showing variations in optical output power of an mPD depending on surrounding temperature of an FP-LD when optical power of a master light beam of the FP-LD is −18 dBm near a threshold current.

For tracking variations in the IL state depending on the center wavelength interval between two light beams, the optical output power of the mPD must have considerable changes with variations in the temperature. As shown in FIG. 5C, even when the power of the master light beam at the FP-LD which is operated near the threshold current is −18 dBm, the electrical output power of the mPD is significantly deviated from the linearity shown in FIG. 5B. Therefore, it is possible to provide a good contrast enough to track the maximum point in a temperature range at which the injection locking effect appears noticeable.

In FIG. 5C, it is recognized that the temperature range in which the injection locking effect is prominent is 2° C., and the SMSR is over 30 dB when the peak point of the injection locking effect is nearly achieved. Such an SMSR is sufficient for a WDM optical communication.

Figure 5D:
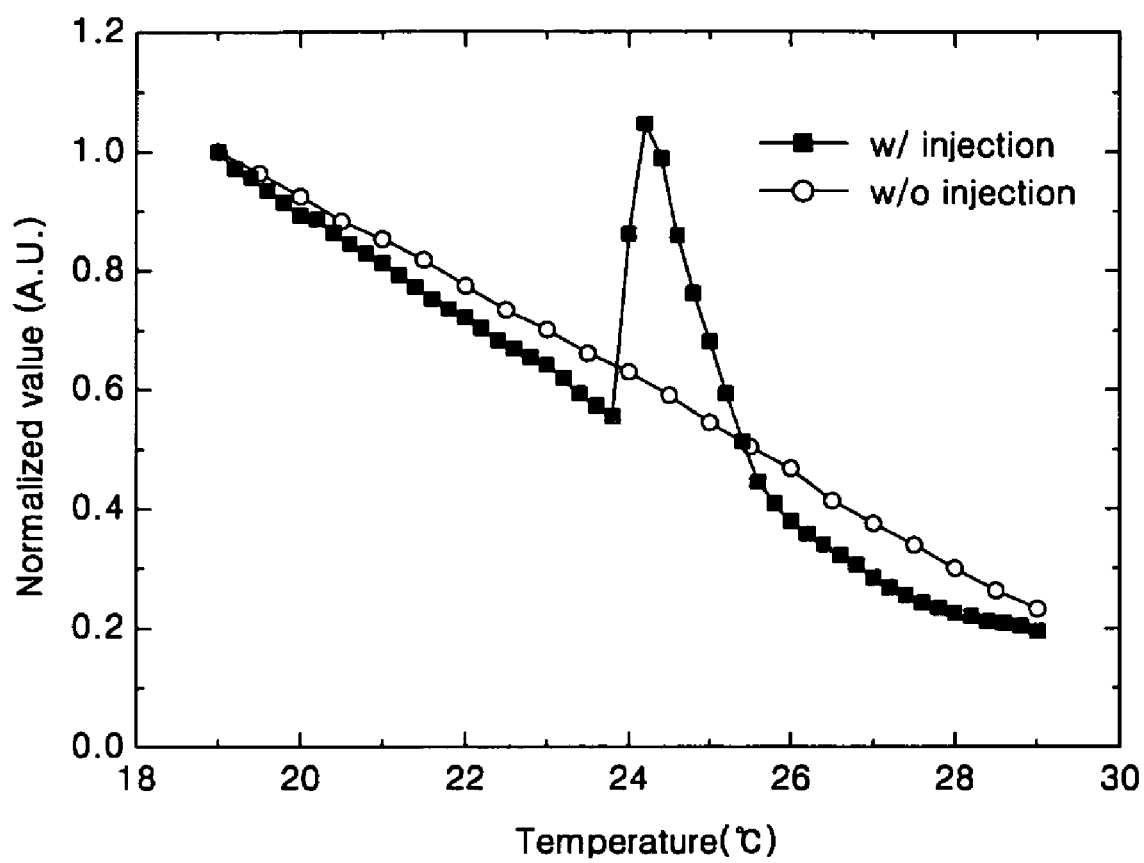
FIG. 5D is a graph showing variations in optical output power of an FP-LD, measured by an mPD, depending on surrounding temperature of an FP-LD.

FIG. 5D illustrates the optical output power of an FP-LD, measured through an mPD, at the variation of temperature. In FIG. 5D, it is recognized that a case that the master light beam is injected (i.e., w/injection) is clearly distinguished from a case that the master light beam in not injected (i.e., w/o injection).

Figure 6A:
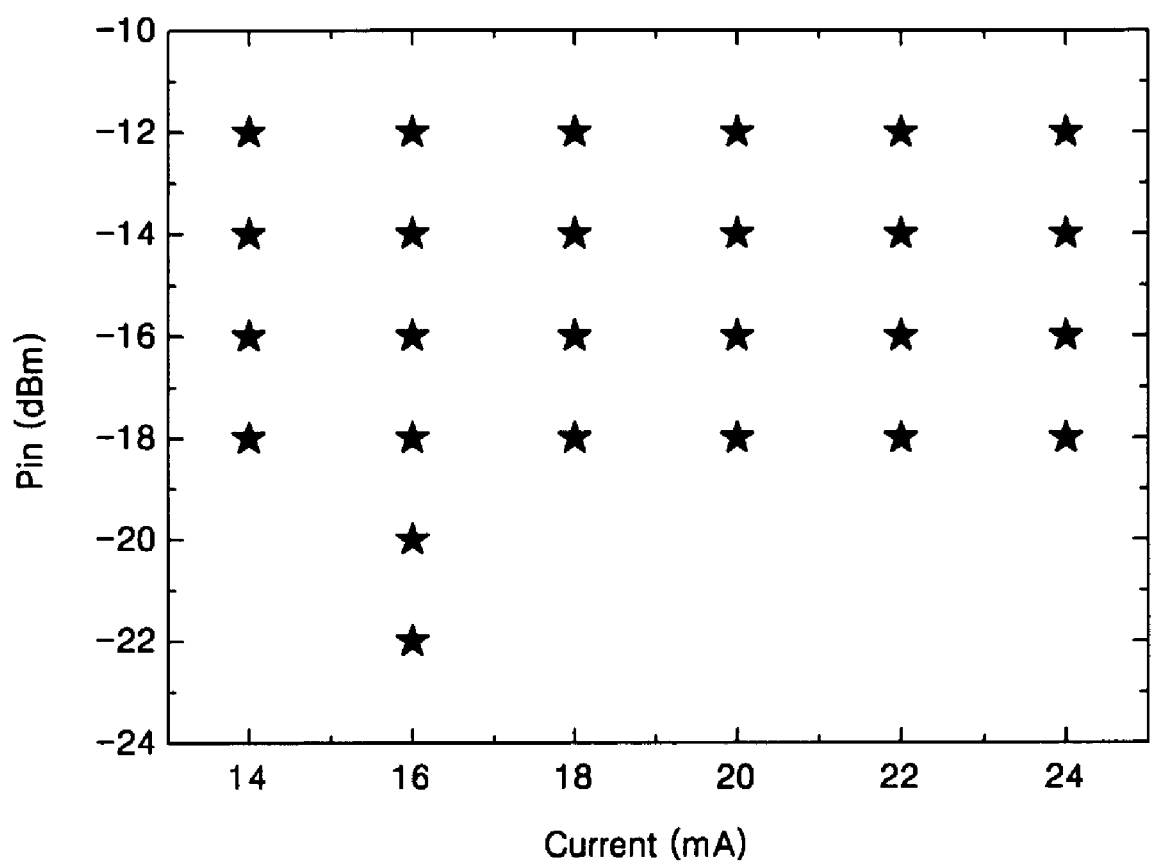
FIG. 6A is a graph showing a bias current of an FP-LD, necessary to obtain $10^{-9}$ BER when the FP-LD output light beam is transmitted through a length of 20 Km at a data transmission rate of 1.25 Gpbs and injected power Pin of a single mode master light beam (DFB-LD at OLT) subjected to an injection locking.

FIG. 6A illustrates a bias current of an FP-LD necessary to obtain $10^{-9}$ BER (bit error rate) after a transmission distance of 20 km at a data rate of 1.25 Gbps and injected optical power ($P_{in}$) of a single mode master light beam (DFB-LD) by which the injection locking can be achieved. It is recognized that, if the optical power of an injection light beam is over −18 dBm, $10^{-9}$ BER can be obtained in a wide range of current.

Figure 6B:
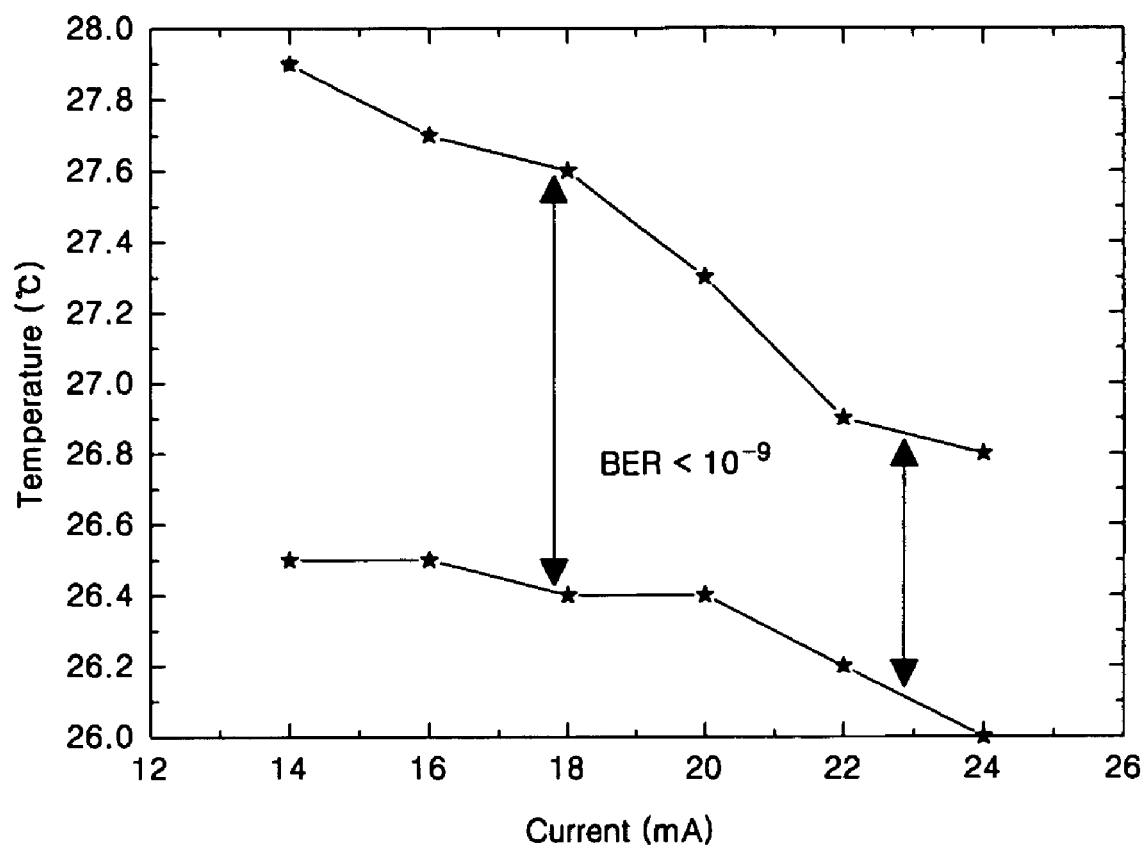
FIG. 6B is a graph showing a temperature band for maintaining $10^{-9}$ BER according to a bias current when injected power of a master light beam is −16 dBm.

FIG. 6B illustrates a temperature range capable of maintaining $10^{-9}$ BER (i.e., an IL effect is sufficiently large)

depending on a bias current when injected optical power of a master light beam is −16 dBm. It is recognized that the smaller bias current causes the larger temperature range for an effective IL. In addition, it should be noted that, as a rate at which data can be modulated with respect to the given BER becomes lower as the bias current of the FP-LD approaches the threshold current, the bias current of the FP-LD should be set to a value closest to the threshold current within bounds satisfying a given data modulation rate.

Figure 7:
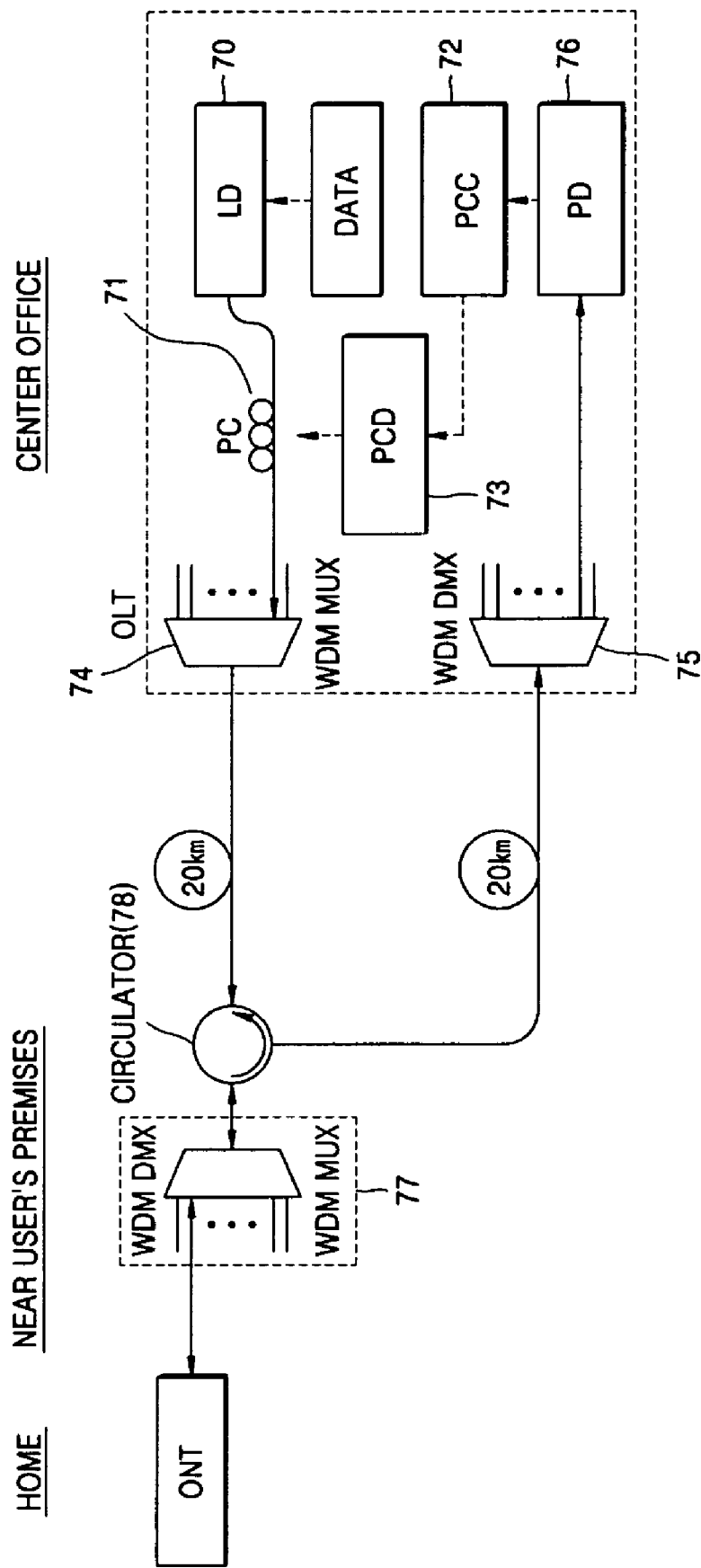
FIG. 7 is a block diagram illustrating a wavelength division multiplexing passive optical network having an optical network terminal according to the present invention.

FIG. 7 illustrates a WDM-PON network having an ONT according to the present invention.

A plurality of single mode light sources, laser diodes (LD) 70, are disposed piece-by-piece or in the form of an integrated array in the central office, and a polarization controller (PC) 71 is connected to an output terminal of the LD 70 to maintain stable injection locking efficiency in the ONT.

The polarization control is accomplished in such a way that a polarization control circuit (PCC) 72 connected to a receive terminal measures variations in the intensity of the optical signal input to the receive terminal and applies the polarization control signal to a polarization control driver (PCD) 73 so as to receive an optimal optical signal, and then the PCD 73 drives the polarization controller 71 according to the control signal. The optical wavelength output from a single mode light source is multiplexed by the WDM MUX and then transmitted to equipment near user's premises. The transmitted optical wavelength is separated from the multiplexed wavelengths by the WDM DMX 74 in the user's side, and then each separated optical wavelength is transmitted to corresponding users, respectively.

In the ONT, as described above, the master light beam from the CO is injected into the FP-LD for the injection locking. In this state, the output light of the FP-LD (i.e., upstream optical signal) is modulated with upstream data and then transmitted to the CO.

The optical wavelengths output from the subscriber's ONT are multiplexed by the WDM MUX near user's premises and then transmitted to the CO via a single mode optical fiber. The multiplexed optical wavelengths received by the CO are demultiplexed by the WDM DMX 75 and then input to a photo detector (PD) 76 provided for each wavelength so that the optical signals are converted into the electrical signals. On the other hand, the WDM MUX/DMX functions in the user's side are implemented in a single system 77, and a circulator 78 is provided in the output terminal of the WDM MUX to couple the downstream light input to the ONT and the upstream light output from the ONT to two optical fibers which are separately provided for the downstream and upstream transmissions, respectively.

The present invention provides following advantages. First, since the FP-LD is used in the ONT, there is no need to allocate a particular wavelength to each user. Therefore, optical network terminals having an identical structure can be provided in a network, so that productability can be improved and installation and inventory management can be facilitated.

Secondly, since a light beam from the single mode light source (e.g., DFB-LD) for transmitting the downstream data from the CO is used for the master light beam for locking the FP-LD, there is no need to have an additional light source for the master light beam in the ONT. In addition, since a single mode light beam is used as a master light beam, it is possible to obtain excellent optical characteristics including a line width of the master light beam in comparison with an injection locking type using an amplified spontaneous emission (ASE). Therefore, it is possible to achieve high speed modulation having a rate up to a few Gbps and also generate an IR state capable of maintaining predefined transmission quality even in lower input power of the master light beam.

Thirdly, though a low-price Febry-Perot laser diode (FP-LD) is used as a modulator, the ONT according to the present invention can provide a high SMSR enough to be used in a typical wavelength division multiplexing based optical communication and directly modulate data at a rate up to a few Gbps. Therefore, it is possible to reduce system cost in comparison with a loop-back type using a Mach-Zehnder modulator or an electro-absorption modulator. Furthermore, optical power losses can be converted into optical power gains for the retransmitted (loop-back) optical signal.

Fourthly, according to the present invention, the master light beam injected for the IL is transmitted from a single mode light source (e.g., DFB-LD), which is located in the CO and used to carry downstream data. The single mode light (SML) beam is more effective than the ASE light beam to generate the IL. In addition, since an additional light source is not necessary, it is possible to reduce system and installation costs. Also, since the optical power loop-backed from the ONT is not attenuated, it is possible to expand the network.

Particularly, according to the loop-back scheme of the present invention, the center wavelength of a mode of the FP-LD is always matched with the center wavelength of the SML from the CO even by simple electric circuitry. Therefore, it is possible to maintain a stable optimal transmission condition even when there are variations in the center wavelength of the downstream SML and the center wavelengths of the FP-LD caused by variations of its surrounding temperature.

Furthermore, a round-trip optical path connecting the CO with a user is determined only by the center wavelength of the SML of the CO, and the CO can arbitrarily allocate the wavelength of the SML. Therefore, it is possible to provide a high degree of flexibility in designing the network configuration and also implement easy and simple network management and operation.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only, and are not for purposes of limitation. Therefore, the scope of the invention is defined not by the detailed description of the invention but by the appended claims, and all differences within the scope will be construed as being included in the present invention.

What is claimed is:

1. An optical network terminal in a wavelength division multiplexing based optical network comprising:
   a modulation timing control signal generator receiving a downstream optical signal sent from a central office and generating a timing control signal designating a start timing and an end timing for modulating an upstream optical signal to be transmitted from a user to the central office;
   an upstream data control circuit generating upstream data according to the timing control signal and controlling modulation of the upstream optical signal according to the timing control signal in response to generation of the upstream data;
   a modulator receiving the upstream data and directly modulating the upstream data by amplifying the downstream optical signal and using the amplified downstream optical signal to produce the upstream optical signal and then output it to the central office;

a monitor photo diode receiving a part of output optical signals of the modulator and then converting them into electrical signals; and a wavelength control circuit receiving the electrical signals, altering operating temperature of the modulator based on the magnitudes of the electrical signals, and shifting the center wavelengths of operation modes to perform a wavelength tracking for matching a center wavelength of the downstream optical signal harmonized with one of the center wavelengths of the operation modes when the electrical signal reaches a maximum value.

2. The optical network terminal according to claim 1, wherein the modulator performs an injection locking for matching a center wavelength of the injected downstream optical signal with one of wavelengths of operation modes of the modulator and then modulates the upstream data with the downstream optical signal to produce the upstream optical signal output to the central office.

3. The optical network terminal according to claim 2, wherein the injection locking is performed by matching the center wavelength of the downstream signal with the closest one of the wavelengths of the operation modes.

4. The optical network terminal according to claim 2, wherein the modulator is a Febry-Perot laser diode.

5. The optical network terminal according to claim 2, wherein a light source of the injected downstream optical signal is a single mode light source.

6. A wavelength division multiplexing based optical network having the optical network terminal according to claim 1.

7. The wavelength division multiplexing based optical network according to claim 6, wherein a group of single mode laser diodes are disposed in the central office in the form of an integrated array or piece by piece, and a polarization controller is connected to an output terminal of each the laser diodes for an optimal injection locking efficiency in the optical network terminal.

8. The wavelength division multiplexing based optical network according to claim 7, wherein a polarization control circuit connected to a receive section of an optical line terminal in the central office monitors intensity variation in the upstream optical signal input to the receive section to apply a polarization control signal for an optimal optical signal reception to a polarization control driver, and wherein the polarization control driver drives the polarization controller based on the polarization control signal.

9. The wavelength division multiplexing based optical network according to claim 7, wherein a wavelength division multiplexer and a wavelength division de-multiplexer are implemented in a single system near user's premises, and wherein a circulator is further provided in an output terminal or an input terminal of the system to couple the downstream optical signal input to the optical network terminal and the upstream optical signal output from the optical network terminal to a downstream optical fiber and a upstream optical fiber, respectively, for communication between the central office and the user.

* * * * *